United States Patent
Jarlkov

(10) Patent No.: US 8,042,790 B2
(45) Date of Patent: Oct. 25, 2011

(54) VAPOUR-LIQUID DISTRIBUTION DEVICE

(75) Inventor: Klaus Risbjerg Jarlkov, Hårlev (DK)

(73) Assignee: Haldor Topsøe A/S, Lyngby (DK)

(*) Notice: Subject to any disclaimer, the term of this patent is extended or adjusted under 35 U.S.C. 154(b) by 549 days.

(21) Appl. No.: 12/265,245

(22) Filed: Nov. 5, 2008

(65) Prior Publication Data
US 2009/0174091 A1    Jul. 9, 2009

(30) Foreign Application Priority Data
Jan. 9, 2008    (DK) .............................. 2008 000029

(51) Int. Cl.
*B01F 3/04*    (2006.01)

(52) U.S. Cl. .................. 261/114.1; 261/114.5

(58) Field of Classification Search ............... 261/114.1, 261/114.2, 114.5
See application file for complete search history.

(56) References Cited

U.S. PATENT DOCUMENTS

| | | |
|---|---|---|
| 1,605,264 A | 11/1926 | Millard |
| 1,640,068 A | 8/1927 | Cyphers |
| 2,136,139 A * | 11/1938 | Kuhni ........................ 261/114.2 |
| 2,578,670 A | 12/1951 | Carleton |
| 3,353,924 A | 11/1967 | Riopelle |
| 3,392,967 A | 7/1968 | Eckert |
| 4,126,540 A | 11/1978 | Grosboll et al. |
| 4,744,929 A * | 5/1988 | Robinson et al. ............... 261/97 |
| 4,764,347 A | 8/1988 | Milligan |
| 4,836,989 A | 6/1989 | Aly et al. |
| 5,132,055 A * | 7/1992 | Alleaume et al. ............... 261/97 |
| 5,158,714 A | 10/1992 | Shih et al. |
| 5,192,465 A | 3/1993 | Petrich et al. |
| 5,224,351 A | 7/1993 | Jeannot et al. |
| 5,942,162 A | 8/1999 | Gamborg et al. |

* cited by examiner

*Primary Examiner* — Charles Bushey
(74) *Attorney, Agent, or Firm* — Dickstein Shapiro LLP

(57) ABSTRACT

A liquid-vapor distribution device for use in two-phase stream concurrent down-flow vessels including:
a plurality of BOXVLTs fabricated in form of self-supporting structures (beams) and tray panels when installed forms a tray which will be essentially leak free at the junctions and between the tray and the vessel wall;
the horizontal self-supporting structure consisting of a bottom plate being perforated with at least one row of apertures of equal size, wherein each aperture is fitted with an elongated down-flow channel (downcomer) being in form of a tube or any other geometric shape with the same geometrical cross sectional shape as the apertures in the beam and the down-flow channel is provided with an inlet for the concurrent two-phase stream, and wherein at least two of the down-flow channels are fitted with a common riser cap being attached to and along at least one wall portion of each down-flow channel and mounted over and spaced apart the inlet of the down-flow channel.

8 Claims, 1 Drawing Sheet

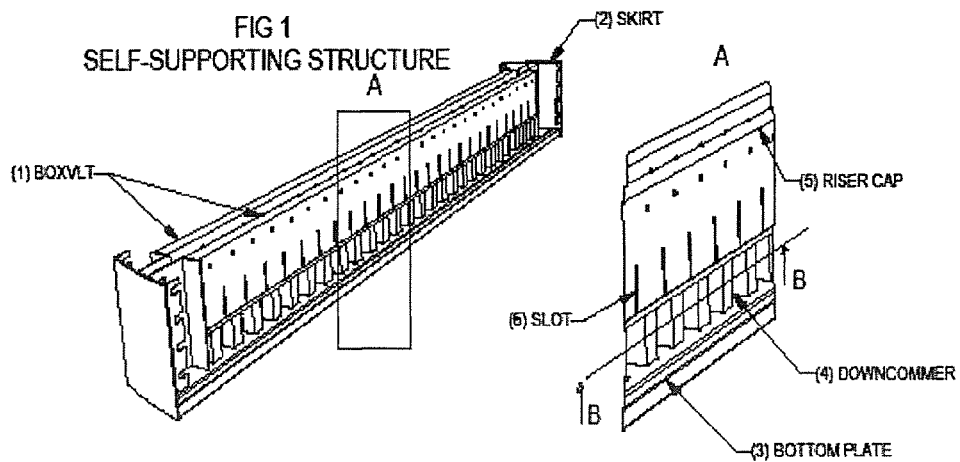
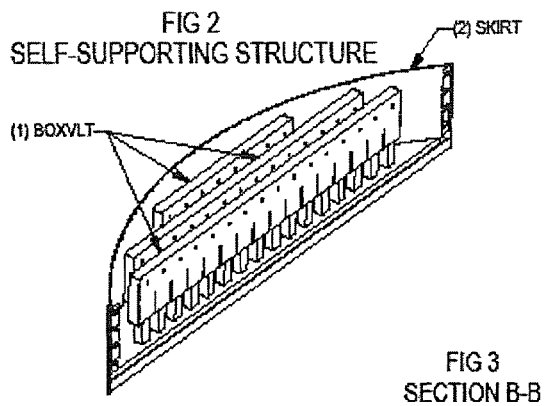
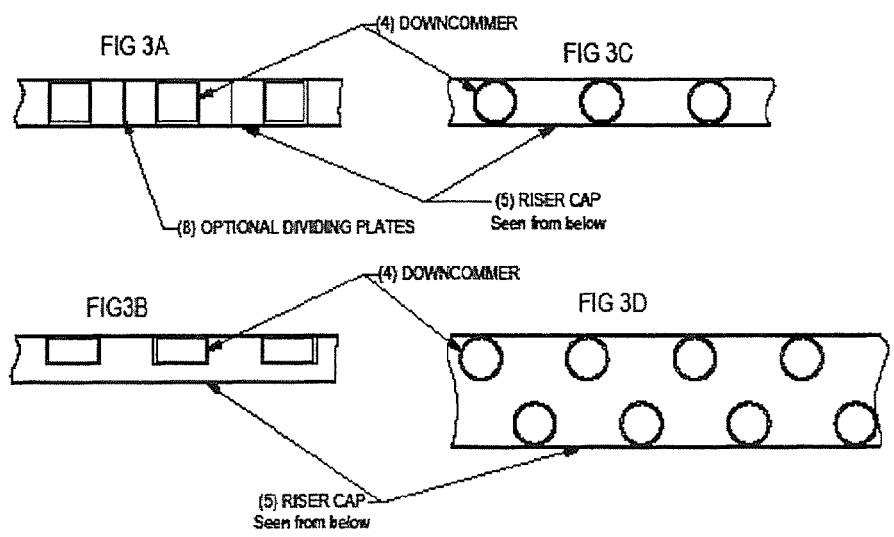

VAPOUR-LIQUID DISTRIBUTION DEVICE

CROSS-REFERENCE TO RELATED APPLICATIONS

This application claims foreign priority benefits under 35 USC 119(a)-(d) to PA2008 000029 filed in Denmark on Jan. 9, 2008.

BACKGROUND OF THE INVENTION

The present invention relates to a liquid-vapour distribution device for use in two-phase concurrent down-flow vessels. In particular, the invention concerns a liquid distribution device in form of a common header combining multiple vapour lift tubes (referred to as a BOXVLT) that improves distribution of liquid and vapour phases when a plurality of these BOXVLTs are assembled over a cross sectional area of a vessel in order to achieve thermal and compositional equilibrium in catalytic reactions. The device is in particular useful in hydroprocessing reactors.

The known designs of liquid distribution devices fall into one of five categories. The first is a series of troughs and overflow weirs to systematically subdivide the liquid into multiple streams before it contacts a catalytic bed. This type is often used in liquid contractors or countercurrent absorbers. An example of this type is described in U.S. Pat. No. 5,192,465.

A second type of liquid distribution devices is a perforated horizontal tray. This may or may not have notched weirs around the perforations. The tray may also have chimneys for vapour flow. This type of distribution device can be used for rough liquid distribution in conjunction with a more sophisticated final liquid distribution tray. Examples of this type are disclosed in U.S. Pat. No. 4,836,989.

The third common type of liquid distribution devices is a chimney tray. This device uses a number of standpipes laid out typically on a regular square or triangular pitch pattern on a horizontal tray. The stand pipes typically have holes in the sides for the passage of liquid. The tops of the standpipes are open to allow vapour flow down through the centre of the chimneys. Some designs use special vapour down-corner chimneys to handle the bulk of the vapour flow. This type is known from U.S. Pat. Nos. 4,126,540 and 3,353,924.

The fourth type of liquid distribution devices is a bubble cap tray. This device uses a number of bubble caps laid out on a regular-pitched pattern on a horizontal tray. The bubble cap is formed with a cap centred concentrically on a standpipe. The sides of the cap are slotted for vapour flow. Liquid flows under the cap and, together with the vapour, flows upward in the annular area and then down through the centre of the standpipe as described in U.S. Pat. No. 5,158,714.

The known trough type distribution device is mechanically complex and very sensitive to levelness. Depending on the design of the transitions between troughs, the quality of the distribution may also be susceptible to fouling.

The known perforated plate design is similar to the chimney design. The chimney design is preferred since it can be designed for a wider range of liquid/vapour loadings and is less susceptible to fouling.

A further known type of liquid distribution devices is perforated tray provided with vapour lift tubes in form of a long legged down-corner fitted with one or more short legged upcomers creating an up-flow zone and down-flow zone within the tube. The sides of the short legged upcomer are slotted and liquid flowing concurrently with vapour is lifted by means of the vapour flow upwardly in an up-flow zone and evenly distributed together with the vapour through the down-flow zone to an underlying catalyst bed as further described in U.S. Pat. No. 5,942,162.

The advantage of a vapour lift tube device over a chimney type design is the significantly wider turndown range possible with the vapour lift tube. As the liquid flow decreases, a properly designed chimney must either become taller or have smaller holes drilled in the side. Due to fabricating tolerances, care of installation and deflection due to operating load, not all of the distribution devices will be at the same level in the vessel. At some level of turndown, some holes will be covered with liquid and others will not. This results in uneven liquid distribution over the surface below the tray.

SUMMARY OF THE INVENTION

This invention is a liquid-vapour distribution device for distribution of a concurrent two-phase stream in a down-flow vessel comprising:
  a plurality of horizontal self-supporting structures acting as support beams and tray panels and when installed forming a tray which will be essentially leak free at junctions of the structures and between the formed tray and inner wall of the vessel;
  each of said horizontal self-supporting structures consisting of a bottom plate being perforated with at least one row of apertures of equal size, wherein each aperture is fitted with an elongated down-flow channel being in form of a tube or any other geometric shape with the same geometrical cross sectional shape as the apertures in said bottom plate and each of the down-flow channels is provided with an inlet for the concurrent two-phase stream, and wherein at least two of said down-flow channels are fitted with a common riser cap being attached to and along at least one wall portion of each of the down-flow channels and mounted over and spaced apart the inlet of each of the down-flow channels.

The combination of down-flow channels and a common riser cap is referred to as a BOXVLT.

The self-supporting structure according to the invention is horizontally supported in the vessel and its edges are tightened against edges of an adjacent self-supporting structure or tray panel with gasket or otherwise sealed to provide an essentially leak free surface covering the cross sectional area of the vessel.

The bottom plate of the self-supporting structure/tray panel is perforated by evenly spaced apertures across its surface, which apertures are distributed in at least one row on the bottom plate. The apertures may be round, square, rectangular or of any other geometric shape. In all cases, an optimised pattern is used to provide approximately even spacing between all perforations and to provide an approximately even ratio of aperture area to horizontal tray area across the entire tray being formed by a plurality of rows of BOXVLTs.

At least one BOXVLT consisting of two down-flow channels covered with a common riser cap create a vapour lift tube device on each self-supporting structure/tray panel with at least two drip points.

The vapour lift tube device according to the invention is similar to the bubble cap device in concept but has several advantages. Since the vapour lift tube device is smaller, more can be placed on a distribution tray being made by arranging a number of beams side by side inside a reactor to achieve better distribution of liquid. With a smaller spacing, the size of these gaps is smaller. Overall wetting efficiency below the tray is better with a smaller pitch than with a larger pitch.

A particular advantage of the distribution device according to the invention is its simplicity that makes it easier and less costly to fabricate and to install in the optimal size proscribed by process conditions.

In many processes where the invention will be used, e.g. hydroprocessing reactors, there can be wide variations in the vapour and liquid phase rates and physical properties over time and during turndown operations. Due to fabricating tolerances and the care of installation, there will be unavoidable variations in the distribution tray levelness. Liquids dropping onto the distribution tray from an inlet distributor or quench zone mixer may be unevenly distributed and could result in liquid height gradients across the tray due to splashing, waves or hydraulic head. An optimized liquid distributor design using the vapour lift tube concept is possible that will provide better liquid distribution below the tray than can be obtained from optimized designs of trough distributors, simple perforated plate distribution trays, chimney type distribution trays or concentric bubble cap distribution trays.

The distribution device of this invention will typically be used in hydroprocessing reactors. By obtaining even distribution of the liquid reactants over the entire reactor cross sectional area, all the catalyst at a given level is evenly wetted. Thus, all the catalysts at a given level operate at the same efficiency, which increases the overall efficiency of the reactor. Additionally, even liquid distribution maintains even radial temperature profiles across the reactor.

In one embodiment of the invention, at least two down-flow channels are covered with a common riser cap being attached to and along two opposite walls of the down-flow channels provide a vapour lift tube with a T-like shaped cross section.

In a further embodiment a vapour lift tube is shaped with a cross section like an inverted U by fitting at least two down-flow channels with a common riser cap, which is attached to and along one wall portion of each down-flow channel.

In still an embodiment a drip edge on the bottom side of the beam is created for each perforation by means of the down-flow channel extending through the beam or by a separate channel piece attached to the beam. The drip edge may further be formed by extrusions on the beam or by equivalent means.

It is preferred that the down-flow channels have the same height at all points on the horizontal self-supporting structure.

It is also preferred that the riser cap has one or more vertical slots cut into its side with a slot height ending at or below the elevation of the inlet of the down-flow channel.

In another preferred embodiment, the inlet end of the riser cap terminates above the level of the horizontal beam so that a liquid in the two-phase stream is not impeded from flowing into the lower portion of the riser cap.

DETAILED DESCRIPTION OF THE INVENTION

Brief Description of the Attached Drawings

FIG. 1 shows a perspective view of the self-supporting structure, which consist of minimum one beam, which includes a riser cap, a down-corner and a bottom plate, the combination thereof is in the following description identified as box vapour lift tube or BOXVLT.

FIG. 2 is showing perspective view of a self-supporting structure with 3 BOXVLTs.

FIG. 3 (A-D) is showing cross-sectional view of the BOX-VLT (seen from below) with examples of different layout of the down-corner with various shapes and various patterns.

DETAILED DESCRIPTION OF THE INVENTION

The liquid-vapour distribution design concept (referred to as self-supporting structure) is shown on FIG. 1 and FIG. 2.

The device consists of one or several BOXVLT 1 extending from one side of the reactor inner wall to the other side of the reactor inner wall, a skirt 2 which is curved with a curvature corresponding to the curvature of the reactor inner wall (not shown) to allow a gastight installation. The longitudinal edge 7 of the self-supporting structure is linear adapted to be assembled with either another self-supporting structure (not shown) or a non-self-supporting tray panel also equipped with one or more BOXVLTs (not shown). All junctions will essentially be leak free. Each BOXVLT consist of a common riser cap which covers two or more down-corners 4. Down-corners 4 can vary in shape, size and layout of the pattern (Examples see FIG. 3). Each down-corner fits into apertures made in the bottom plate 3. Between each down-corner 4 is cut one or more vertical slots 6 into the side wall of the riser cap 5. The top of the slot is at or below the inlet end (not shown) of the down-corners 4.

FIG. 3 is a cross section (section B-B) through a BOXVLT looking upwards into the riser cap. FIG. 3A is a BOXVLT with squared down-corners aligned and fasten to both walls of the riser cap in a straight pattern. FIG. 3B has rectangular down-corners aligned and fasten to only one wall of the riser also in a straight pattern. FIG. 3C is similar to FIG. 3A but with circular down-corners. FIG. 3D is shown with circular down-corners in a triangular pattern.

A further improved distribution efficiency, i.e. lower sensitivity against male-distribution of the two-phase flow may be obtained by mounting dividing plates 8 between the down-flow channels as shown in FIGS. 3A-C.

In operation of the invention, a liquid level will be established on a tray made up by a number of beams each furnished with BOXVLTs in form of self bearing structures and as tray panels. The parts are assembled along their edges and along a reactor wall in gas/liquid tight manner. The liquid level on the thus formed tray will be above the bottom of the common riser caps 5, but below the top of slots 6 in the riser caps. Vapour will pass through the slots creating a pressure drop between the inside and outside of the BOXVLT being composed by the common riser cap and a plurality of down-flow channels. Due to the lower pressure inside the BOXVLT, the liquid level will be higher inside than outside of the BOXVLT. The vapour and liquid will mix inside the riser cap with the vapour lifting the liquid to flow up and over the wall at inlet of the down-flow channels 4. Liquid will partially disengage, while flowing over the wall at the inlets and down in the down-flow channels 4. At the opening below the bottom plates 3, the liquid and vapour will further disengage with the liquid draining off the drip edge of the down-corner 4.

The invention claimed is:

1. A liquid-vapour distribution device for distribution of a concurrent two-phase stream in a down-flow vessel comprising:
   a plurality of horizontal self-supporting structures acting as support beams and tray panels and when installed forming a tray which will be essentially leak free at junctions of the structures and between the formed tray and inner wall of the vessel;
   each of said horizontal self-supporting structures consisting of a bottom plate being perforated with at least one row of apertures of equal size, wherein each aperture is fitted with an elongated down-flow channel being in form of a tube or any other geometric shape with the same geometrical cross sectional shape as the apertures in said bottom plate and each of the down-flow channels is provided with an inlet for the concurrent two-phase stream, and wherein at least two of said down-flow channels are fitted with a common riser cap being attached to and along at least one wall portion of each of the down-flow channels and mounted over and spaced apart the inlet of each of said down-flow channels.

2. The liquid-vapour distribution device of claim 1, wherein the down-flow channels have the same height at all points on the horizontal self-supporting structure.

3. The liquid-vapour distribution device of claim 1, wherein the riser cap has one or more vertical slots cut into its side with a slot height ending at or below level of the inlet of the down-flow channel.

4. The liquid-vapour distribution device of claim 1, wherein an inlet end of the riser cap terminates above the level of the bottom plate of the self-supporting structure.

5. The liquid-vapour distribution device of claim 1, wherein the common riser cap is attached two opposite walls of each down-flow channel.

6. The liquid-vapour distribution device according to claim 1, wherein a dividing plate is arranged between one or more of said down-flow-channels.

7. A two-phase stream concurrent down-flow vessels comprising a liquid-vapour distribution device according to claim 1.

8. A reactor being provided with one or more liquid-vapour distribution devices according to claim 1.

* * * * *